A. D. HEDGES.
AUTOMOBILE TOP.
APPLICATION FILED DEC. 15, 1919.
1,390,555.
Patented Sept. 13, 1921.
3 SHEETS—SHEET 1.
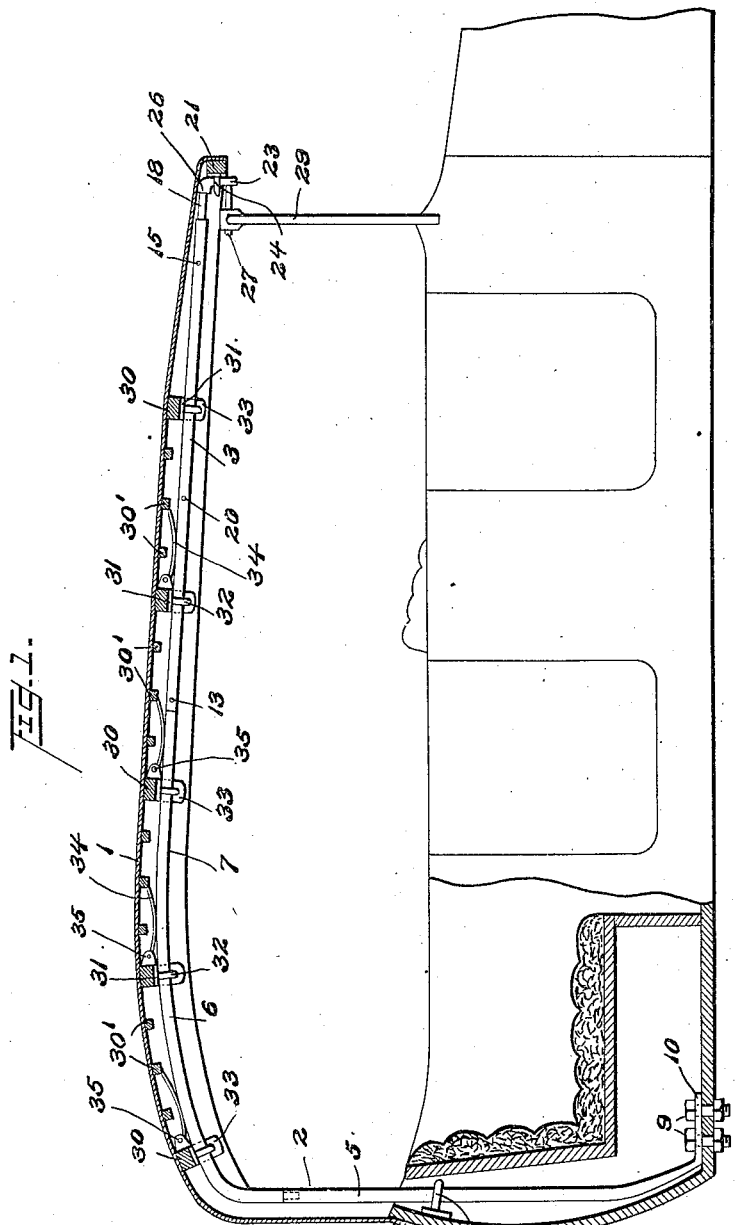

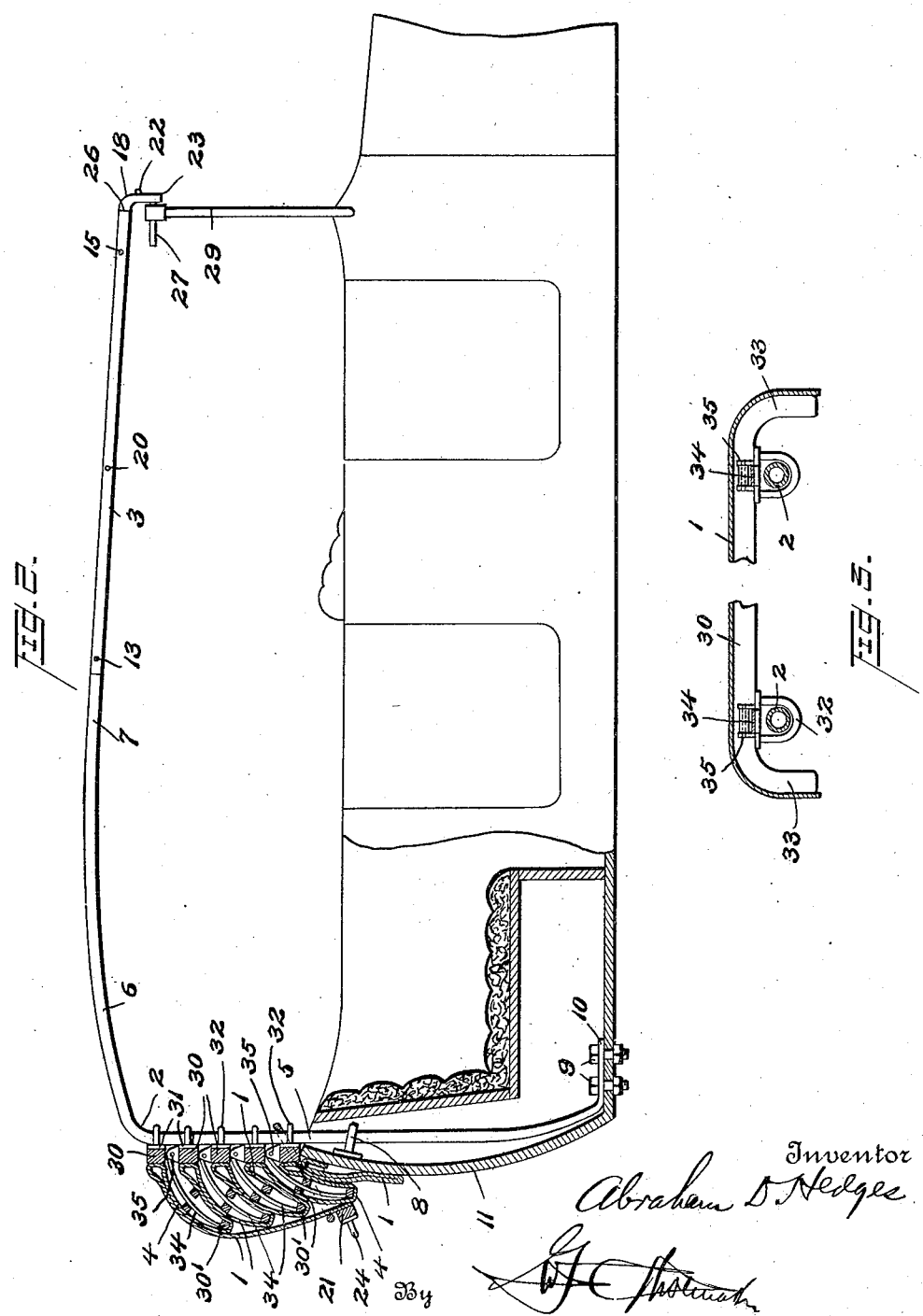

A. D. HEDGES.
AUTOMOBILE TOP.
APPLICATION FILED DEC. 15, 1919.
1,390,555.
Patented Sept. 13, 1921.
3 SHEETS—SHEET 3.
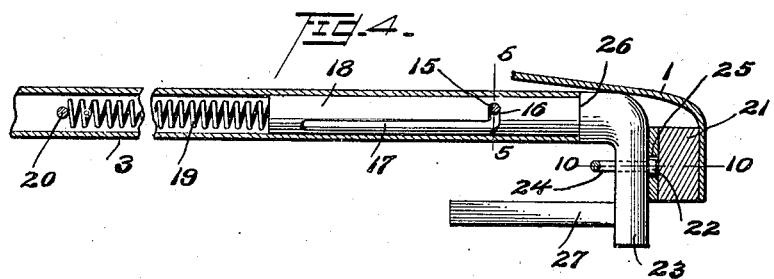
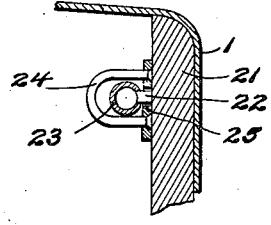
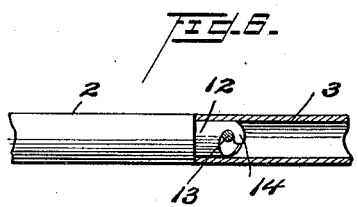
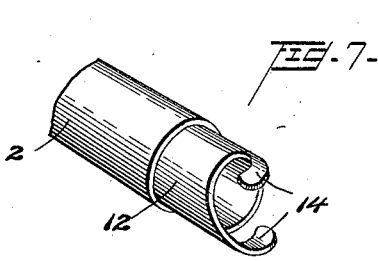
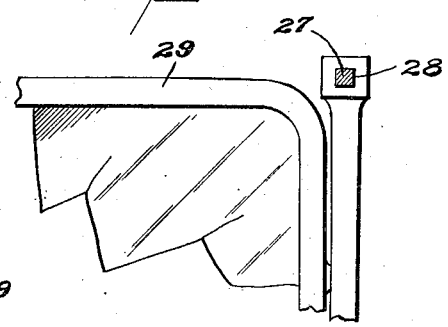
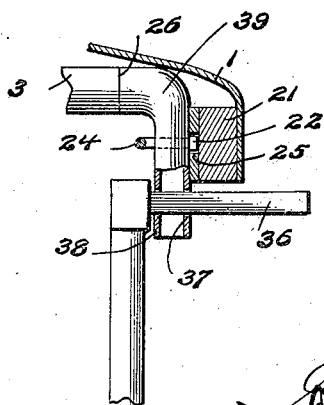

UNITED STATES PATENT OFFICE.

ABRAHAM D. HEDGES, OF LONG BEACH, CALIFORNIA.

AUTOMOBILE-TOP.

1,390,555.   Specification of Letters Patent.   Patented Sept. 13, 1921.

Application filed December 15, 1919. Serial No. 345,102.

*To all whom it may concern:*

Be it known that I, ABRAHAM D. HEDGES, a citizen of the United States, residing at Long Beach, in the county of Los Angeles and State of California, have invented certain new and useful Improvements in Automobile-Tops, of which the following is a specification.

The invention relates to improvements in automobile tops.

The object of the present invention is to improve the construction of automobile tops and more especially the construction of tops shown and described in applications Nos. 272,270 and 272,271, filed by me January 21, 1919, and also that shown and described in application No. 345,103, filed by me December 15, 1919, and to provide a simple, practical one-man top of strong and durable construction adapted to be readily installed on an automobile and capable of enabling the flexible cover to be readily extended to arrange it for use, and easily folded when it is not desired to use the same.

A further object of the invention is to provide an automobile top of this character equipped with spring actuated means for engaging the front of the flexible cover for securing the cover in its extended position and for stretching and maintaining the cover in a taut condition, means being provided for maintaining the spring actuated device in a retracted position to release the cover and enable the latter to be readily folded at the back of the automobile.

Another object of the invention is to provide an automobile top having the front portion of its frame detachable to enable it to be arranged at the back of the automobile when not in use and provided with means for securely locking it in its connected relation with the fixed rear portion of the framework when the flexible cover is relieved of the spring actuated device and it is desired to fold the cover.

With these and other objects in view, the invention consists in the construction and novel combination of parts hereinafter fully described, illustrated in the accompanying drawings and pointed out in the claims hereto appended, it being understood that various changes in the form, proportion, size and minor details of construction, within the scope of the appended claims, may be resorted to without departing from the spirit of the invention, or sacrificing any of the advantages thereof.

In the drawing, in which like numerals of reference designate corresponding parts in the several figures:

Figure 1 is a longitudinal sectional view of an automobile top constructed in accordance with this invention and shown applied to an automobile body, the latter being partly in section and the flexible cover being extended and arranged for use.

Fig. 2 is a similar view, the flexible cover being folded and the slidable spring actuated cover engaging and holding member being held in its retracted position.

Fig. 3 is a transverse sectional view of the automobile top.

Fig. 4 is an enlarged longitudinal sectional view through the front portion of one side of the framework.

Fig. 5 is a detail transverse sectional view illustrating the construction for securing the spring actuated cover engaging and stretching member in its retracted position.

Fig. 6 is an enlarged detail longitudinal sectional view illustrating the construction for securing the detachable front section of the side member to the fixed rear section.

Fig. 7 is a detail perspective view of the carrying plug of the fixed rear section.

Fig. 8 is a detail sectional view illustrating the construction of the slidable connection between the front engaging member and the wind shield or post.

Fig. 9 is a detail sectional view illustrating another form of slidable connection between the wind shield and the slidable cover engaging and stretching member.

Fig. 10 is a sectional view taken along line 10—10 in Fig. 4.

In the accompanying drawings, in which is illustarted the preferred embodiment of the invention, the one-man top comprises in its construction a flexible cover 1 and a top frame or framework composed of spaced side members each consisting of a fixed rear section 2 and a detachable front section 3 which are adapted to be removed from the fixed rear sections and arranged in folds 4 of the flexible cover in a manner similar to the detachable front sections of the last mentioned co-pending application. The framework is preferably made of tubular metal, but may be constructed of any suitable material, and the fixed rear section 2 of each side member is composed of an upright supporting portion 5 and intermediate curved portion 6 and a front substantially straight portion 7. The rear section is arranged in a yoke 8 and is detachably secured at the lower end of the upright portion 5 by means of a bolt 9 or other suitable fastening device which passes through a projecting lug 10 of the said upright portion 5 of the rear section 2. The yoke 8 is located at the upper portion of the rear end of the body 11 of the automobile and the bolt 9 preferably pierces the bottom of the body, but various other means may be employed for rigidly and detachably securing the upright portion of the fixed rear portion of the side member to the body of the machine.

The detachable front section 3 is connected at its rear end to the front end of the portion 7 of the rear section by means of a plug 12 and a transverse rivet 13 or other suitable fastening device. The plug 12, which may be tubular, or any other suitable construction, is secured within the front end of the rear section of the side member and projects therefrom and is provided at its projecting portion with opposite hooks 14 arranged to be engaged with and disengaged from the transverse rivet 13 by a slight rotary movement of the front section 3. In connecting the front section to the rear section of the side member, the front section is slipped on the projecting stud with the transverse fastening device 13 arranged between the projecting diametrically opposite hooks. The hooks extend in opposite directions and a slight rotary movement of the front section will carry the transverse fastening device into and out of engagement with the bills of the hooks. The fixed character of the rear section will prevent the same from turning when the front section is partially rotated.

This partial rotary movement of the detachable front section of the side member of the framework is also utilized by carrying a front transverse rivet or fastening device 15 into and out of reversely extending angularly related branches 16 of a longitudinal slot 17 of a slidable spring actuated cover engaging and stretching member 18. The slidable cover engaging member is telescoped within the front section 3 and is provided with the said longitudinal slot 17 through which the transverse rivet or pin 15 passes. The rivet or pin 15 pierces the opposite sides of the front section as shown and slidably connects the member 18 with the front section 3. The slidable cover engaging member 18 is urged forwardly or outwardly by a coiled spring 19 interposed between the rear end of the slidable member 18 and the stop 20 preferably consisting of a transverse pin or rivet. The slidable member is adapted to be pressed inwardly against the action of the coil spring 19 and it is retained in such position by a partial rotary movement of the front section 3 which partial rotary movement carries the pin 15 into the angularly related branches 16 of the longitudinal slot 17 and the rear pin or rivet 20 in engagement with the projecting hooks 14 of the stud 13. This inward movement of the slidable member shortens the side member of the framework and relieves the flexible cover 1 of the tension of the spring 19 and enables a front bow 21 of the flexible cover to be readily engaged with and disengaged from a projection 22 of a depending arm 23 of the slidable member 18. The front bow which is slidably connected with the side members of the frame by yokes or staples 24 is provided near each end with a recess 25 to receive the projection 22 of the depending arm 23 of the slidable member 18 whereby the front bow is interlocked with the slidable member 18. The staple or yoke forms a sleeve member and slidably embraces the framework and is adapted to be readily moved over the same to arrange the cover in a folded position at the back of the body and to extend the cover to the front of the body. When the slidable member is released by a slight rotary movement of the front section 3 the spring urges the slidable member outwardly and maintains the projection 22 in engagement with the recess 25 and also maintains the front section 3 of the side member in engagement with the plug of the rear member so that there is no liability of the cover becoming disengaged from the projection or the front section becoming detached from the rear section of the framework. The front end of the slidable member 18 is enlarged at 26 to provide a partial head which is in flush relation with the front end of the section 3 when the slidable member is located in its retracted position. This provides a smooth surface and enables the bracket 24 of the front bow to slide readily onto and off of the arm 23 of the slidable member.

The depending arm 23 of the slidable member is secured at its lower end to a longitudinal rod 27 preferably square in cross section and slidable in a square opening 28 in the wind shield post 29, but the longitudinal rod 27 may be of any other non-circular shape in cross section to prevent it from rotating in the opening of the wind shield post whereby lateral rolling or side movement of the framework of the top carried thereby is effectually prevented and a firm connection with respect to such movements provided at the wind shield.

The flexible cover is provided at intervals with bows 30 secured to the flexible cover and to brackets 31 which are provided with yokes or staples 32 slidably embracing the side member of the framework and constituting sleeve elements. The flexible cover is provided at intervals between the main transverse bows 30 with a plurality of auxiliary bow members 31 which are preferably straight and terminate short of the side edges of the flexible cover which is shaped at the side edges by the curved portions 33 of the main bows. The yokes or staples provide simple and cheap sleeve elements for the slidable brackets and folded spring arms 34 are hinged to the brackets at 35 and are connected with auxiliary bow members 31 similar to the hinged folded resilient arms of the aforesaid application, No. 345,103. The flexible cover is movable readily rearward to fold it in the manner described in the said application and the auxiliary bow members leave the framework and the hinged folding resilient arms cause the flexible cover to be arranged in folds, as shown at the back of the body. These resilient arms swing forwardly to the position illustrated in Fig. 1 of the drawing in the unfolding of the cover and operate as explained in the aforesaid application to assist in stretching and extending the cover of the one-man top. The top may be easily and quickly arranged for use by sliding the rod 27 through the opening 28 of the wind shield post 29 and connecting the rear end of the front section 3 and the front end of the rear section by introducing the plug into the rear end of the front section. The slidable member 18 is then pressed rearwardly or inwardly against the action of the coiled spring 19 and is locked in such position by a partial rotary movement of the front section 2 which as already explained engages the rear transverse pin or rivet with the hooks of the plug rear section. This shortens the side member of the framework and enables the flexible cover to be readily drawn forward and arranged over the framework with the front bow in engagement with the projections of the depending arms of the slidable members. A slight rotary movement of the front section 2 will then release the slidable member and enable the springs 19 to place the flexible cover under tension and maintain the cover firmly in such position so that there will be no liability of the parts of the top becoming disengaged through jar and vibration incident to the travel of the automobile.

In Fig. 9 of the drawing is illustrated another form of slidable connection between the slidable engaging and stretching member and the wind shield. In this form of the invention, the wind shield is provided with a fixed forwardly projecting rod 36 rectangular in cross section and extending through an opening 37 of the depending arm 38 of the slidable member 39. The fixed forwardly projecting rod 36 forms a guide for the depending arm 38 of the slidable member and the operation is similar to that heretofore described, the member 39 being permitted to move backward and forward freely and being held against lateral movement. When a slidable rod is employed and is guided in an opening of the wind shield, the opening or guiding means may, of course, be of any desired construction and at the most convenient point.

While the main bows which have the curved terminals for shaping the said portions of the curtains are all shown secured to the slidable brackets in the accompanying drawings, yet it will be apparent that either a main bow or an auxiliary bow free of a slidable connection with the top frame may be employed and the auxiliary bows may, if desired, be extended at their terminals at intervals and shaped similar to the main bows. When the main bows are free of the frame like the auxiliary bows, they will ride loose on the top frame and fold with the flexible cover. Any number of these main and auxiliary bows may be employed, and they may be arranged at any preferred interval.

What is claimed is:—

1. An automobile top including a top frame, a flexible cover arranged on the top frame, a spring actuated member slidable on and carried by the top frame and connected with the front of the flexible cover for stretching the same, means for slidably connecting the spring actuated member with a fixed portion of the automobile, and means for locking the slidable member in a retracted position to relieve the flexible cover of the spring.

2. An automobile top comprising a top frame including a side member, a flexible cover, a slidable spring actuated member carried by the top frame, means carried by the cover for slidably connecting it with the side member and for detachably connecting it with the slidable member, and means for locking the slidable member in a retracted position against the action of the spring to relieve the cover of the said spring.

3. An automobile top comprising a top frame including a side member provided with a detachable front section, a slidable spring actuated member carried by the front section and movable inwardly to shorten the side member, a flexible cover having means for connecting it to the slidable member, and means for securing the slidable member in a retracted position and for fastening the detachable front section to prevent disconnection of the same while the slidable member is retracted.

4. An automobile top comprising a top frame including a side member provided with a detachable front section, a slidable spring actuated member carried by the front section and movable inwardly to shorten the side member, a flexible cover having means for connecting it to the slidable member, and simultaneously operable means for retaining the slidable member in a retracted position and for locking the front section against removal.

5. An automobile top comprising a top frame including a side member provided with a detachable front section, a slidable spring actuated member carried by the front section and movable inwardly to shorten the side member, a flexible cover having means for connecting it to the slidable member, and means simultaneously operable by a rotary movement of the front section for retaining the slidable member in a retracted position and for locking the front section against removal.

6. An automobile top comprising a top frame including a side member provided with a detachable front section, a slidable spring actuated member carried by the front section and movable inwardly to shorten the side member, a flexible cover having means for connecting it to the slidable member, and means simultaneously operable by a rotary movement of the front section for retaining the slidable member in a retracted position and for locking the front section against removal, said slidable front member and front section being also releasable by a partial rotary movement of the said front section.

7. An automobile top comprising a top frame including front and rear sections, one of the sections being provided with a projecting member fitting in the other section and having projecting hooks, and a transverse pin engageable with the hooks by a partial rotary movement of one of the sections to lock the sections against relative longitudinal movement, a spring actuated slidable member carried by the front section, and also slidably connected with and guided by a fixed portion of the automobile, and a flexible cover supported by the top frame and having means for connecting it with the slidable member.

8. An automobile top comprising a top frame including a side member having a front detachable section, a flexible cover, a spring actuated slidable member carried by the front section for engaging the cover and slidably connected with and guided by a fixed portion of the automobile, and means controlled by the rotary movement of the front section for retaining the slidable member in a retracted position against the action of the said spring.

9. An automobile top comprising a top frame including a side member having a front detachable section, a flexible cover, a spring actuated slidable member carried by the front section for engaging the cover, said front section having a longitudinal slot and provided with angularly related branches extending in opposite directions, and means carried by the front section and operating in the slot for engaging the said branches to retain the slidable member in a retracted position against the action of the spring.

10. An automobile top comprising a top frame including a side member composed of front and rear sections, means for connecting the sections consisting of a plug having projecting hooks, and a fastening device adapted to be engaged with and disengaged from the hooks by a partial rotary movement of the front section, a slidable member operating in the front section and provided with a longitudinal slot and having angularly related branch slots, means carried by the front section and operating in the longitudinal slot and engageable with the angularly related branches by a rotary movement of the front section, and a cover having means for connecting it with the slidable member.

11. An automobile top comprising a top frame including a side member, a flexible cover, a spring actuated slidable member carried by the side member, and slidable backwardly and forwardly on the said member and having means for connecting it with the flexible cover, and means for also slidably connecting the slidable member with a fixed portion of the body of an automobile at the windshield thereof.

12. An automobile top comprising a top frame including a side member, a flexible cover, a spring actuated slidable member carried by the side member and having means for connecting it with the flexible cover, a longitudinally disposed rod connected to and arranged in parallelism with the slidable member, and means carried by the body of the automobile for guiding the said rod and for connecting the same with a fixed portion of the body of the automobile.

13. An automobile top comprising a top frame including a side member, a flexible cover, a spring actuated slidable member carried by the side member and having means for connecting it with the flexible cover, a longitudinally disposed rod connected to and arranged in parallelism with the slidable member, and means carried by the body of the automobile for guiding the said rod, and for holding the same against rotary movement to prevent lateral movement of the automobile top.

14. An automobile top comprising a top frame including a side member, a spring actuated slidable member carried by the top frame, a flexible cover having means for engaging the slidable member, a rod connected with the slidable member and polygonal in cross section, and a wind shield post having a polygonal opening receiving and forming a guide for the said rod.

15. The combination with guiding means carried by the body of an automobile, of an automobile top comprising a top frame including a side member, a spring actuated slidable member carried by the top frame and having a depending arm, a rod connected to the said arm and arranged in parallelism with the slidable member and operating in the said guiding means, and a cover provided with means for engaging the slidable member.

16. The combination with guiding means carried by the body of an automobile, of an automobile top comprising a top frame including a side member, a spring actuated slidable member carried by the top frame and having a depending arm, a rod connected to the said arm and arranged in parallelism with the slidable member and operating in the said guiding means, and a cover provided at intervals with means slidably arranged on the side member of the top frame, and a front bow secured to the flexible cover and slidably connected with the side member and movable over the slidable member and the depending arm thereof and engageable with the same.

17. The combination with guiding means carried by the body of an automobile, of an automobile top comprising a top frame including a side member, a spring actuated slidable member carried by the top frame and having a depending arm, a rod connected to the said arm and arranged in parallelism with the slidable member and operating in the said guiding means, and a cover provided at intervals with means slidably arranged on the side member of the top frame, and a front bow secured to the flexible cover and slidably connected with the side member and movable over the slidable member and the depending arm thereof, and coacting interlocking means carried by the arm and the said front bow for detachably securing the cover to the slidable member.

18. An automobile top including a top frame provided at the front with a slidable cover engaging member having a depending arm, and means for slidably connecting the depending arm with the wind shield of an automobile, said means including a rod carried by one of the parts, and the other part being provided with an opening receiving the rod, said rod being arranged in substantial parallelism with the slidable member.

In testimony whereof I affix my signature.

ABRAHAM D. HEDGES.